June 26, 1956
L. R. MOSKOWITZ ET AL
2,752,028
ORIENTING DEVICE
Filed June 28, 1952
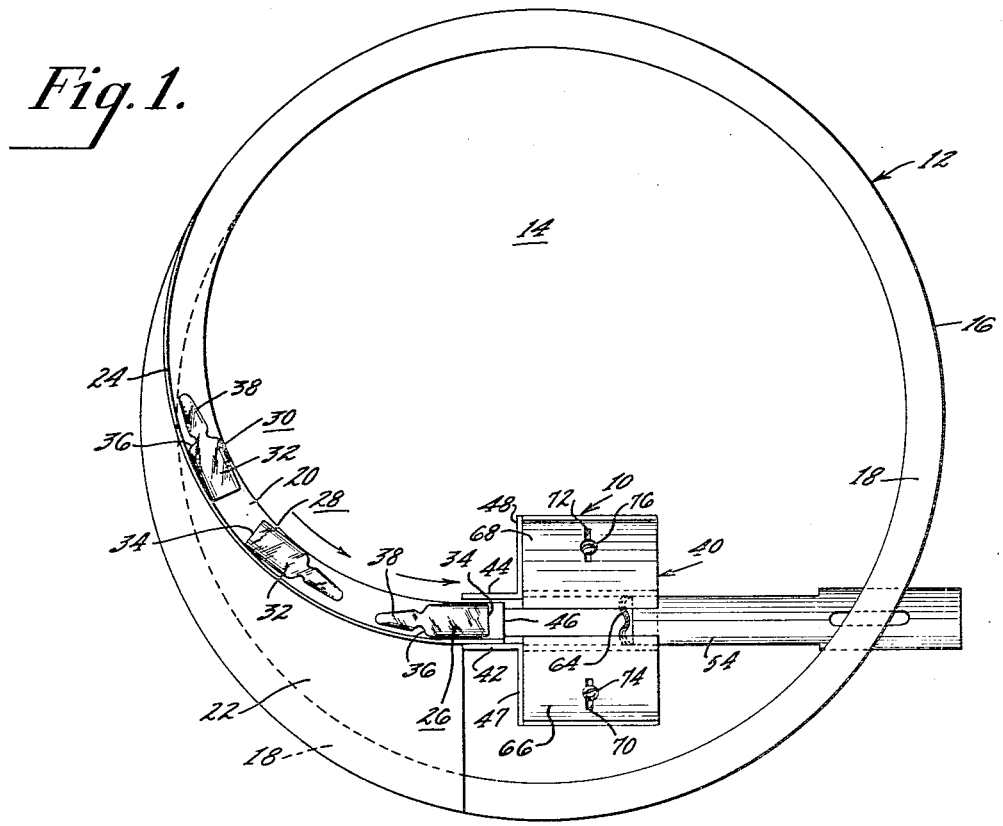
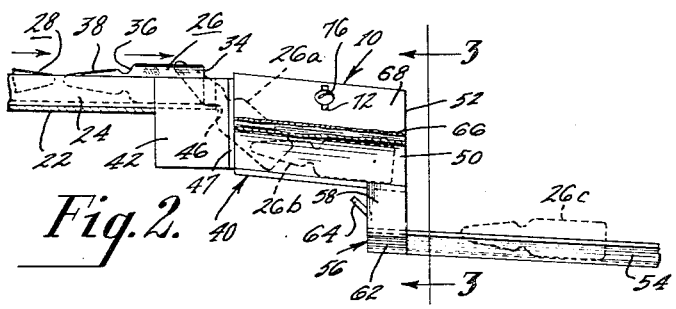
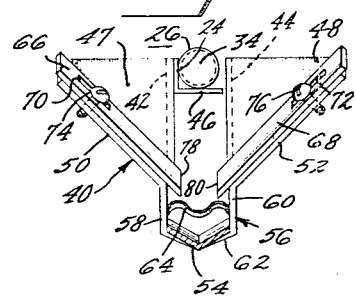
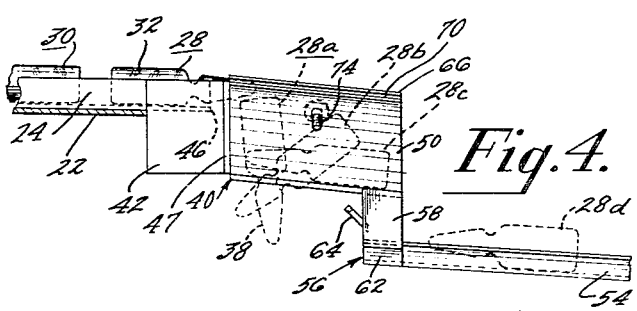
INVENTORS
*Roger E. Schell &*
*Lester R. Moskowitz*
BY
ATTORNEY United States Patent Office 2,752,028
Patented June 26, 1956

2,752,028
ORIENTING DEVICE

Lester R. Moskowitz, Fort Monmouth, and Roger E. Schell, Woodbury, N. J., assignors to Radio Corporation of America, a corporation of Delaware Application June 28, 1952, Serial No. 296,148

11 Claims. (Cl. 198—33)

This invention relates generally to orienting devices, and more particularly to an orienting device for orienting randomly aligned ampuls, vials, or any other similar containers into a uniform sequential alignment.

In certain types of equipment used in the mass processing of containers, it is usually necessary and desirable that they be oriented in uniform sequential alignment. This is particularly true where the containers are to be fed to filling machines, inspection machines, packaging machines, labelling machines, and the like.

In the mass processing of containers such as ampuls and vials used in the pharmaceutical industry, the containers are fed to the processing machines by moving them sequentially on feeding tracks or belts. A commonly used method of moving the containers along a feeding track is by means of vibratory motion imparted to the track. Containers inside of a hollow drum may be made to move laterally and upwardly along a spiral track fixed to the inside cylindrical wall of the drum by imparting a vibratory motion to the drum. The containers or ampuls moving along the spiral track toward the processing equipment will be randomly aligned, that is, they may be moving either base-first or neck-first. Since most processing equipment is constructed so as to receive the containers in only one position, as for example, base-first, it is necessary to orient all of the containers into a uniform sequential alignment.

It is accordingly a principal object of the present invention to provide a novel orienting device for aligning randomly aligned containers into a uniform sequential alignment.

It is a further object of this invention to provide an improved orienting device to orient randomly aligned ampuls, vials, or the like, into a uniform sequential alignment.

Another object of the present invention is to provide an improved orienting device, interposed in a feeding track, which will allow properly oriented containers to pass through unchanged in position and which will turn over improperly oriented containers so that they assume a desired alignment.

Still another object of the present invention is to provide an improved orienting device which has adjustable means for handling containers of various sizes.

According to the invention, these and other objects and advantages are attained in a novel and highly efficient orienting device for orienting randomly aligned containers into a base-first position while said containers are in motion. While not limited thereto, the orienting device of the present invention is particularly applicable to a feeding device depending upon vibratory motion to move the containers forwardly. In one embodiment of the invention, forwardly moving, randomly aligned ampuls on a feeding track are guided by means of guide walls, onto the orienting device. At least one of the guide walls is attached to the feeding track so that the vibratory motion of the feeding track is imparted to the orienting device. If an ampul on the feeding track is in a desired alignment position, that is, base-first, the ampul will fall base-first between two inclined plates. The plates have lower straight edges which are spaced apart a distance less than the diameter of the cylindrical body of the ampul. Vibratory motion will move the ampul in a base-first position along the lower portions of the plates until it falls base-first onto an exit track. The ampul will then proceed base-first along the exit track to the processing equipment. If, on the other hand, an ampul is improperly aligned on the feeding track, that is, it is moving forwardly in a neck-first position, the orienting device will turn it over. As the ampul moves neck-first along the feeding track, and passes the end of the feeding track, it will fall onto the inclined plates of the orienting device. The tip-end or neck of the ampul will fall between the lower edges of the inclined plates. The inertia of the falling ampul will cause it to roll over on its shoulder until the ampul assumes a base-first position. The vibratory motion imparted to the orienting device will then cause the ampul to fall base-first onto the exit track, and thence proceed therealong to the processing equipment. The spaced apart inclined plates may be adjusted to accommodate ampuls of different sizes by varying the distance between the lower straight edges of the plates.

A more complete understanding of the invention may be had from the following description when read in connection with the following drawing in which:

Fig. 1 is a plan view of an ampul orienting device, in accordance with the present invention, used in connection with a vibratory feeder, Fig. 2 is a side elevational view of the orienting device partly in cross-section, and with some parts broken away, illustrating an ampul moving base-first therethrough.

Fig. 3 is a cross-sectional view of the orienting device taken along the line 3—3 of the Fig. 2, and Fig. 4 is a side elevational view of the orienting device similar to Fig. 2, and illustrating an ampul being turned over thereby.

Referring now to the drawing, and more particularly to Fig. 1, there is shown an orienting device 10 associated with a vibratory feeding machine 12. The vibratory feeding machine 12 comprises a hollow drum having a bottom wall 14 and a cylindrical wall 16 extending upwardly therefrom. Spiralling upwardly from the bottom wall 14 is a spiral track 18 having its outer edge fastened to the cylindrical wall 16. A vibratory motion is imparted to the vibratory feeding machine 12 in such a manner that any containers or ampuls which may be placed on the bottom wall 14 will be moved, by the vibratory action of the machine 12, onto the feeding track 18. The vibratory action of the machine 12 will move the ampuls along the upwardly spiralling track 18 toward the orienting device 10.

The operation of the orienting device 10 will be explained in connection with the uniform, sequential alignment of liquid-filled ampuls into a base-first position for processing in an ampul inspection machine. The filled and sealed ampuls are placed on the bottom wall 14 of the vibratory feeding machine 12. A vibratory motion imparted to the machine 12, by means of an electromagnet or any other means well known in the art, will cause the ampuls to move outwardly toward the outer wall 16, and upwardly along the spiral track 18. An upper track portion 20 of the spiral track 18 is curved inwardly from the outer wall 16 and is supported therefrom by a bracket member 22. Along the outer curved edge of the track portion 20 is an upwardly extending side wall 24 for the purpose of guiding the ampuls along in their forward motion toward the orienting device 10.

In Fig. 1, there is shown ampuls 26, 28 and 30 moving along the track portion 20, in the direction indicated by the arrows, and approaching the orienting device 10.

Each ampul comprises a cylindrical body 32 having a base 34 and a shoulder 36. Extending from the shoulder 36 is an elongated tip or neck 38 whose cross-sectional diameter along any transverse plane is smaller than the diameter of the body 32 of the ampul.

The orienting device 10 is adapted to permit ampuls approaching its base-first to proceed therethrough in that position. Ampuls entering the orienting device 10 neck-first, however, are turned over by the orienting device 10 and are caused to proceed in a base-first position. To this end, the orienting device 10 comprises a symmetrical frame 40. The frame 40 comprises two similar, vertical guide walls 42, 44 positioned on each side of the track portion 20 and adjacent the end 46 of the track portion 20. The walls 42, 44 act as guide means to guide the ampuls from the track portion 20 onto the orienting device 10. Extending laterally from the forward ends of each of the guide walls 42, 44 are triangular shaped walls 47, 48, respectively. The lower edge of each of the walls 47, 48 is inclined downwardly and inwardly. A wall 50 extends forwardly and slightly downwardly from the lower edge of the wall 47 and forms a plate supporting means therewith for the purpose to be described hereinafter. A wall 52, symmetrically disposed to the wall 50 about the longitudinal axis of the symmetrical frame 40, extends forwardly from the lower edge of the wall 48. Walls 52, 48 form a plate supporting means as will be explained hereinafter. It will be noted that the inner surfaces of the walls 50, 52 form an angle with each other which is less than 180°.

For the purpose of supporting an exit track 54 which has a V-shaped cross-section, there is provided a U-shaped bracket 56 having one arm 58 extending downwardly from the forward lower end of the wall 50, another arm 60 extending downwardly from the forward lower end of the wall 52, and a V-shaped portion 62 joining the lower ends of the arms 58, 60. The exit track 54 is fixed to the portion 62 of the bracket 56 by any suitable means.

Straddling the arms 58, 60, and fixed thereto by any suitable means, is a bumper 64, for the purpose hereinafter appearing.

In order to accommodate ampuls having cylindrical bodies of different diameters, there are provided plates 66, 68 mounted on and overlying the walls 50, 52 of the frame 40. Each of the plates 66, 68 are formed with vertical slits 70, 72, respectively. The plates 66, 68 are adjustably mounted on the walls 50, 52 by means of screws 74, 76, respectively. The shanks of the screws 74, 76 pass through the slots 70, 72, respectively, and engage with a threaded opening in the walls 50, 52, respectively. If desired, the screws 74, 76 may be provided with suitable nuts for tightening purposes. The plates 66, 68 are adjusted on the walls 50, 52 until their straight lower edges 78, 80, respectively, are spaced apart a distance which is greater than the greatest diameter of the neck 38 of an ampul but smaller than the diameter of the cylindrical body 32 of the ampul. The parallel edges 78, 80 of the plates 66, 68, respectively, form a slightly sloping plane below the track portion 20 and above the exit track 54.

In order to move ampuls over the orienting device 10, a vibratory motion must be imparted thereto. To this end, the guide wall 42 of the frame 40 is fixed to the side wall 24 of the vibratory machine 12, as by soldering, or by any other suitable means. The vibratory motion imparted to the machine 12 can thus be transmitted to the orienting device 10.

Referring to Figs. 2 and 3, there is shown an ampul 26 passing between the guide walls 42, 44 and about to enter the orienting device 10. The ampul 26 has been proceeding along the feeding track 20 in a base-first position. Since it is desired to orient all of the ampuls in a base-first position, the orienting device 10 will permit the ampul 26 to pass therethrough without being turned over. As the vibratory motion urges the ampul 26 along the track portion 20, it will fall off the end 46 thereof and its base 34 will momentarily come to rest adjacent the lower edges 78, 80 of the plates 66 and 68, respectively. The ampul 26 will then assume the position shown by the dashed outline 26a of the ampul. Continued vibratory motion of the orienting device 10 will cause the ampul 26 to assume a base-first position wherein the body 32 of the ampul 26 will lie between the plates 66, 68 and assume the position shown by the dashed outline 26b of the ampul. Further vibratory motion will cause the ampul to proceed along the exit track 54 base-first as indicated by the dashed outline 26c of the ampul. It is thus seen that an ampul, as for example, the ampul 26, approaching the orienting device 10 in a desired base-first position will proceed therethrough without changing its base-first position.

Referring now to Fig. 4, there is shown an ampul 28 approaching the orienting device 10 in a neck-first position. As the vibratory motion of the machine 12 urges the ampul 28 over the edge 46 of the track portion 20, the tip or neck 38 of the ampul 28 will fall through the space between the lower edges 78, 80 of the plates 66, 68, respectively, as shown by the dashed outline 28a of the ampul. Since the transverse diameter of the body 32 of the ampul 28 is greater than the distance between the lower edges 78, 80 of the plates 66, 68, respectively, the ampul will roll on its shoulder 36, as shown by the dashed outline 28b of the ampul. Inertia will cause the ampul to roll over until it is proceeding base-first between the plates 66, 68, as indicated by the dashed outline 28c of the ampul. Continued vibratory motion of the orienting device will then cause the ampul 28 to fall onto the exit track 54 and proceed base-first, as indicated by the dashed outline 28d of the ampul. Thus, it is seen that an ampul approaching the orienting device 10 in a tip-first or neck-first, position will be turned over by the orienting device 10 so that it will proceed in a base-first position onto the exit track 54.

Most ampuls approaching the orienting device 10 in a tip-first position will undergo a 180° turn, as explained above, and as shown in Fig. 4. Occasionally, however, an ampul may remain in a substantially vertical position with its neck 38 extending between the opening between the lower edges 78, 80 of the plates 66, 68, respectively. The inertia of the fall from the feeding track portion 20 onto the orienting device 10 may not be great enough to turn the ampul over 180° if the neck portion 38 is heavier or longer than the cylindrical body 32 of the ampul. This condition may occur when the ampul is only partly filled or when excessive glass has been left on the neck of the ampul after it has been sealed. Under these circumstances, the vibratory motion of the machine 12 will cause the ampul to move toward the exit track 54 in a substantially vertical position. When the neck 38 of the ampul, however, comes in contact with the bumper 64, the ampul will be further rotated in a manner to cause it to proceed in a base-first position. The ampul will then fall onto the exit track 54 in a base-first position and proceed thereon in a properly oriented position. Thus, it is seen that the bumper 64 provides a means for turning over ampuls which are top heavy.

While the operation of the orienting device 10 has been described in connection with a vibratory feeding machine, it is within the scope of the invention that the feeding track to, and the exit track from, the orienting device 10 may be of the moving belt type. Under these circumstances, the motion of the ampuls along the orienting device may be caused by imparting vibratory movement to the orienting device 10 in any suitable and known manner.

Although the orienting device of the present invention has been described in connection with the orientation of a single line of randomly aligned ampuls, it is evident that the orienting device may be used to orient any type of similar containers having a body and a neck portion where the transverse diameter of the body portion is greater than that of the neck portion. The operation of the orienting device of this invention is independent of the center of gravity of the containers. The containers may be of any material provided the latter has sufficient mechanical strength to withstand the normal handling shocks to which it is subjected.

What is claimed is:

1. An orienting device for orienting a line of randomly aligned containers, moving on a feeding track, into a line of containers aligned only base-first, said containers comprising a cylindrically shaped body and a neck extending from one end thereof, said neck having a smaller transverse diameter than that of said body; said orienting device comprising guide means disposed adjacent said feeding track to guide said containers onto said device, plate supporting means fixed to and extending forwardly from said guide means, exit track supporting means fixed to and extending downwardly from the forward end of said plate supporting means, an exit track fixed to and extending forwardly from the lower end of said exit track supporting means, a pair of plates, and means for adjustably mounting said plates on said plate supporting means, said plates having adjacent surfaces forming an angle of less than 180° with each other and lower straight edges substantially parallel to each other and spaced apart a distance greater than the transverse diameter of said neck but less than the transverse diameter of said body, said edges defining a plane below said feeding track and above said exit track.

2. An orienting device as defined in claim 1 wherein said guide means comprise two substantially parallel walls, one on each side of said feeding track and adjacent the end thereof, and said walls being spaced apart a distance slightly greater than the transverse diameter of said body.

3. An orienting device as defined in claim 1 wherein said guide means comprise two substantially parallel walls, one on each side of said feeding track and adjacent the end thereof, said walls being spaced apart a distance slightly greater than the transverse diameter of said body, and at least one of said walls being secured to said feeding track, whereby a vibratory motion imparted to said feeding track will be transmitted to said device.

4. An orienting device as defined in claim 1 wherein said plate supporting means comprises two downwardly and inwardly sloping walls forming an angle of less than 180° with each other, and means securing said sloping walls to said guide means, said sloping walls being spaced apart at their lower ends, and said edges of said plates extending beyond said lower ends of said sloping walls.

5. An orienting device as defined in claim 1 wherein each of said plates are formed with a substantially vertical slot in an upper portion thereof, and said adjustable mounting means comprises a screw having a threaded shank extending through said slot and in engagement with said plate holding means and a head in engagement with said plate.

6. An orienting device as defined in claim 1 characterized by the addition of a bumper fixed to said exit track supporting means between said lower straight edges of said plates and said exit track.

7. In a vibratory feeding machine of the type wherein a line of containers are moved forwardly on a feeding track by means of a vibratory motion imparted to said machine, an orienting device for orienting randomly aligned containers into a base-first position, said containers comprising a body having a base at one end and a neck extending from the other end, said neck having a smaller transverse diameter than that of said body; said orienting device comprising guide means fixed to said feeding track and adjacent an end thereof for guiding said containers onto said device, plate supporting means extending forwardly from said guide means, a U-shaped bracket having arms fixed to said plate supporting means and extending downwardly from the forward end thereof, an exit track extending forwardly from the lower end of said U-shaped bracket, a pair of plates adjustably mounted on said plate supporting means at an angle of less than 180° to each other, said plates having lower straight edges substantially parallel to each other and spaced apart a distance greater than the transverse diameter of said neck but smaller than the transverse diameter of said body, and said edges defining a plane below said feeding track and above said exit track.

8. An orienting device as defined in claim 7 wherein a bumper is fixed between the arms of said U-shaped bracket.

9. An orienting device as defined in claim 7 wherein each of said plates are formed with a vertical slot adjacent an upper portion thereof, and screw means extending through said slots and engaging said plate supporting means for varying the spacing between the lower straight edges of said plates.

10. An orienting device as defined in claim 7 wherein said guide means, plate supporting means, and said U-shaped bracket are integral with each other and form a symmetrical frame.

11. An orienting device as defined in claim 7 wherein said guide means, said plate supporting means, said U-shaped bracket, and said exit track are integral with each other, whereby the vibratory motion of said machine is imparted to said device.

References Cited in the file of this patent

UNITED STATES PATENTS

| | | |
|---|---|---|
| 81,404 | Pierce | Aug. 25, 1868 |
| 896,573 | Pyper | Aug. 18, 1908 |
| 1,181,230 | Kotkovsky | May 2, 1916 |
| 1,658,428 | Charles | Feb. 7, 1928 |
| 2,252,498 | Flaws | Aug. 12, 1941 |
| 2,609,914 | Balsiger | Sept. 9, 1952 |

FOREIGN PATENTS

| | | |
|---|---|---|
| 279,119 | Great Britain | Oct. 15, 1927 |